(12) United States Patent
Yokino et al.

(10) Patent No.: US 9,074,933 B2
(45) Date of Patent: *Jul. 7, 2015

(54) SPECTROMETER MODULE

(75) Inventors: Takafumi Yokino, Hamamatsu (JP); Katsumi Shibayama, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 271 days.

This patent is subject to a terminal disclaimer.

(21) Appl. No.: 13/637,408

(22) PCT Filed: Mar. 16, 2011

(86) PCT No.: PCT/JP2011/056247
§ 371 (c)(1),
(2), (4) Date: Jan. 30, 2013

(87) PCT Pub. No.: WO2011/125440
PCT Pub. Date: Oct. 13, 2011

(65) Prior Publication Data
US 2013/0141718 A1 Jun. 6, 2013

(30) Foreign Application Priority Data
Apr. 1, 2010 (JP) ................. P2010-085206

(51) Int. Cl.
*G01J 3/40* (2006.01)
*G01J 3/28* (2006.01)
(Continued)

(52) U.S. Cl.
CPC ............... *G01J 3/28* (2013.01); *G01J 3/0208* (2013.01); *G01J 3/021* (2013.01); *G01J 3/0259* (2013.01); *G01J 3/0262* (2013.01); *G01J 3/18* (2013.01)

(58) Field of Classification Search
CPC ........ G01J 3/0208; G01J 3/021; G01J 3/0243
USPC .................. 356/305, 326–328, 334
See application file for complete search history.

(56) References Cited

U.S. PATENT DOCUMENTS 4,571,074 A 2/1986 Thevenon
6,614,528 B1 9/2003 Bohle
(Continued)

FOREIGN PATENT DOCUMENTS

CN 101014841 8/2007
CN 101216595 7/2008
(Continued)

OTHER PUBLICATIONS

"Combining MEMS Technology with Image Sensor Technology Newly Developed "Thumb Sized" Ultra-Compact Spectroscope Started Shipping Samples of MS Series C10988MA(X)", News Release, Hamamatsu Photonics K.K., URL: https://jp.hamamatsu.com/hamamatsu/press/2008/common/pdf/2008_08_28.pdf, Aug. 28, 2008, p. 1-4 (with partial English-language translation attached).

(Continued)

*Primary Examiner* — Kara E Geisel
*Assistant Examiner* — Hina F Ayub
(74) *Attorney, Agent, or Firm* — Drinker Biddle & Reath LLP

(57) ABSTRACT

A spectroscopic module 1 is provided with a spectroscopic unit 8 and a photodetector 9 in addition to a spectroscopic unit 4 and a photodetector 5 and thus can enhance its detection sensitivity for light in a wide wavelength range or different wavelength regions of light. A light-transmitting hole 5b and a light-absorbing layer 12 are disposed between light detecting portions 5a, 9a, while a reflection unit 7 is provided so as to oppose the layer 12 (i.e., region R), whereby the size can be kept from becoming larger. Ambient light La is absorbed by the layer 12. Any part of the light La transmitted through the region R in the layer 12 is reflected to the region R by the unit 7 formed so as to oppose the region R, whereby stray light can be inhibited from being caused by the incidence of the light La.

3 Claims, 6 Drawing Sheets

(51) Int. Cl.
*G01J 3/18* (2006.01)
*G01J 3/02* (2006.01)

(56) References Cited

U.S. PATENT DOCUMENTS

| | | | |
|---|---|---|---|
| 7,733,492 B1 | 6/2010 | Szarmes et al. | |
| 7,852,474 B2 | 12/2010 | Dobschal et al. | |
| 8,013,993 B2 | 9/2011 | Shibayama et al. | |
| 8,045,155 B2 | 10/2011 | Suzuki et al. | |
| 2007/0242268 A1* | 10/2007 | Dobschal et al. | 356/328 |

FOREIGN PATENT DOCUMENTS

| | | |
|---|---|---|
| DE | 101 37 428 | 2/2003 |
| EP | 2287579 | 2/2011 |
| JP | 3-39572 | 6/1991 |
| JP | 4-294223 | 10/1992 |
| JP | 2000-171300 | 6/2000 |
| JP | 2009-92680 | 4/2009 |
| JP | 2009-300414 | 12/2009 |
| JP | 2009-300420 | 12/2009 |
| JP | 2009-300424 | 12/2009 |

OTHER PUBLICATIONS

English-language translation of International Preliminary Report on Patentability (IPRP) dated Nov. 22, 2012 that issued in WO Patent Application No. PCT/JP2011/056247.

English-language translation of International Preliminary Report on Patentability (IPRP) dated Nov. 22, 2012 that issued in WO Patent Application No. PCT/JP2011/056286.

* cited by examiner (a)

(b)

(c)

(a)

(b)

SPECTROMETER MODULE

TECHNICAL FIELD

The present invention relates to a spectroscopic module which disperses and detects light.

BACKGROUND ART

Known as a conventional spectroscopic module is one comprising a block-shaped support defining a biconvex lens having a first convex surface provided with a spectroscopic unit such as a blazed diffraction grating and a second convex surface provided with a photodetector such as a photodiode (see, for example, Patent Literature 1). In such a spectroscopic module, light incident on the second convex surface is dispersed by the spectroscopic unit, and thus dispersed light is detected by the photodetector.

CITATION LIST

Patent Literature

Patent Literature 1: Japanese Patent Application Laid-Open No. 4-294223

SUMMARY OF INVENTION

Technical Problem

The above-mentioned spectroscopic module can be made smaller but is hard to enhance its detection sensitivity for light having a wide wavelength range or different wavelength regions of light. This is because the blazed diffraction grating characteristically exhibits a high efficiency for light in a specific wavelength region.

In view of such circumstances, it is an object of the present invention to provide a spectroscopic module which can accurately detect light in a wide wavelength range or different wavelength regions of light while being prevented from becoming larger in size.

Solution to Problem

For achieving the above-mentioned object, the spectroscopic module in accordance with the present invention comprises a main unit for transmitting therethrough light incident thereon from one side; a first spectroscopic unit, disposed on the other side of the main unit, for dispersing the light incident on the main unit and reflecting the light to the one side of the main unit; a first photodetector, arranged on the one side of the main unit, for detecting a first light having a first order diffraction light dispersed by the first spectroscopic unit; a reflection unit for reflecting a second light having a second order diffraction light dispersed by the first spectroscopic unit; a second spectroscopic unit, disposed on the other side of the main unit, for dispersing the second light reflected by the reflection unit and reflecting the second light to the one side of the main unit; and a second photodetector, arranged on the one side of the main unit, for detecting a third light dispersed by the second spectroscopic unit; wherein, on the one side of the main unit, a light entrance portion for letting the light into the main unit and a light-absorbing layer for absorbing the light are disposed between a first light detecting portion of the first photodetector and a second light detecting portion of the second photodetector; and wherein the reflection unit is located closer to the first and second spectroscopic units than are the first and second photodetectors and the light-absorbing layer and opposes the light-absorbing layer.

In this spectroscopic module, light incident on the main unit is dispersed and reflected to one side of the main unit by the first spectroscopic unit. In the light dispersed by the first spectroscopic unit, the first light advances to the one side of the main unit and is detected by the first photodetector. In the light dispersed by the first spectroscopic unit, the second light advances to the one side of the main unit and is reflected to the other side of the main unit by the reflection unit. The second light reflected by the reflection unit is dispersed and reflected to the one side of the main unit by the second spectroscopic unit. In the light dispersed by the second spectroscopic unit, the third light advances to the one side of the main unit and is detected by the second photodetector. Since the second spectroscopic unit and second photodetector are thus provided in addition to the first spectroscopic unit and first photodetector, the detection sensitivity can be enhanced for light in a wide wavelength range or different wavelength regions of light. Further, the light entrance portion and the light-absorbing layer are provided between the first light detecting portion of the first photodetector and the second light detecting portion of the second photodetector, while the reflection unit is disposed so as to oppose the light-absorbing layer. Thus using a region between the first and second light detecting portions can prevent the spectroscopic module from becoming larger in size. When light is let into the main unit from the light entrance portion, ambient light, which is likely to reach the light entrance portion, is absorbed by the light-absorbing layer. Any part of ambient light transmitted through the light-absorbing layer is reflected to the light-absorbing layer by the reflection unit disposed so as to oppose the light-absorbing layer. This can inhibit stray light from being caused by the incidence of ambient light. Because of the foregoing, the present invention makes it possible to accurately detect light in a wide wavelength range or different wavelength regions of light, while preventing the size from becoming larger.

Preferably, a region between the first and second photodetectors in the light-absorbing layer is included in the reflection unit when seen from the one side of the main unit. In this structure, a part of the ambient light transmitted through the light-absorbing layer can be reflected more reliably to the light-absorbing layer.

Preferably, the main unit has a first part and a second part located closer to the first and second photodetectors than is the first part and joined to the first part, while the reflection unit is disposed between the first and second parts. In this structure, the reflection unit can be formed easily and accurately at a position, closer to the first and second spectroscopic units than is the light-absorbing layer, opposing the light-absorbing layer. When being provided between the first and second parts, the reflection unit may be required to be formed as a multilayer structure including a reflection layer having a favorable reflection characteristic and a foundation layer compatible with the main unit. Here, the reflection unit is provided by forming the foundation layer in the second part and forming the reflection layer on the foundation layer, and the first and second parts are joined to each other so as to hold the reflection unit therebetween. This allows the reflection layer to face the first and second spectroscopic units, whereby the second light can be reflected reliably.

Advantageous Effects of Invention

The present invention can provide a spectroscopic module which can accurately detect light in a wide wavelength range or different wavelength regions of light while being prevented from becoming larger in size.

DESCRIPTION OF EMBODIMENTS

Figure 1:
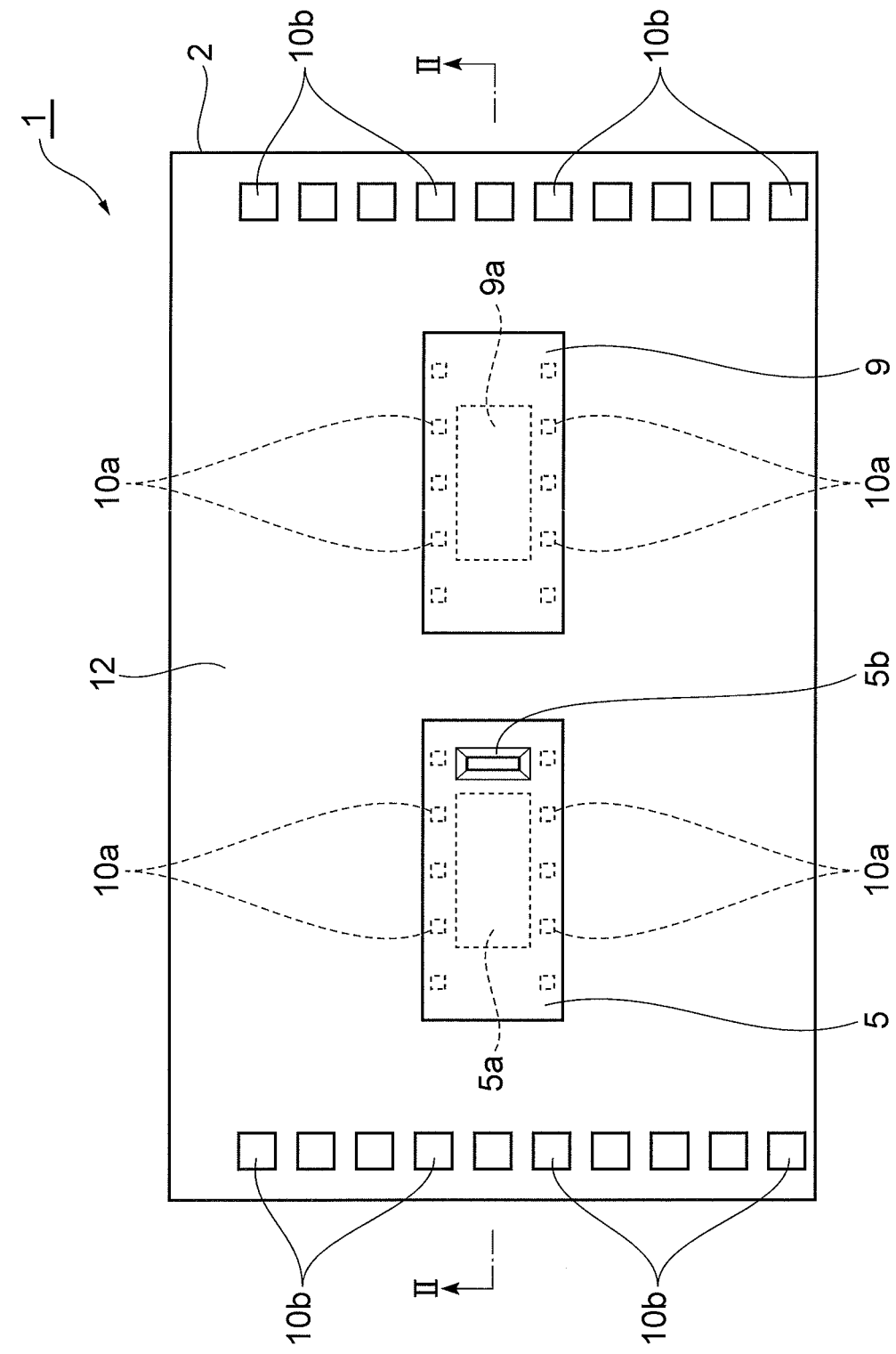
FIG. 1 is a plan view of one embodiment of the spectroscopic module in accordance with the present invention.

In the following, preferred embodiments of the present invention will be explained in detail with reference to the drawings. In the drawings, the same or equivalent parts will be referred to with the same signs while omitting their overlapping descriptions.

Figure 2:
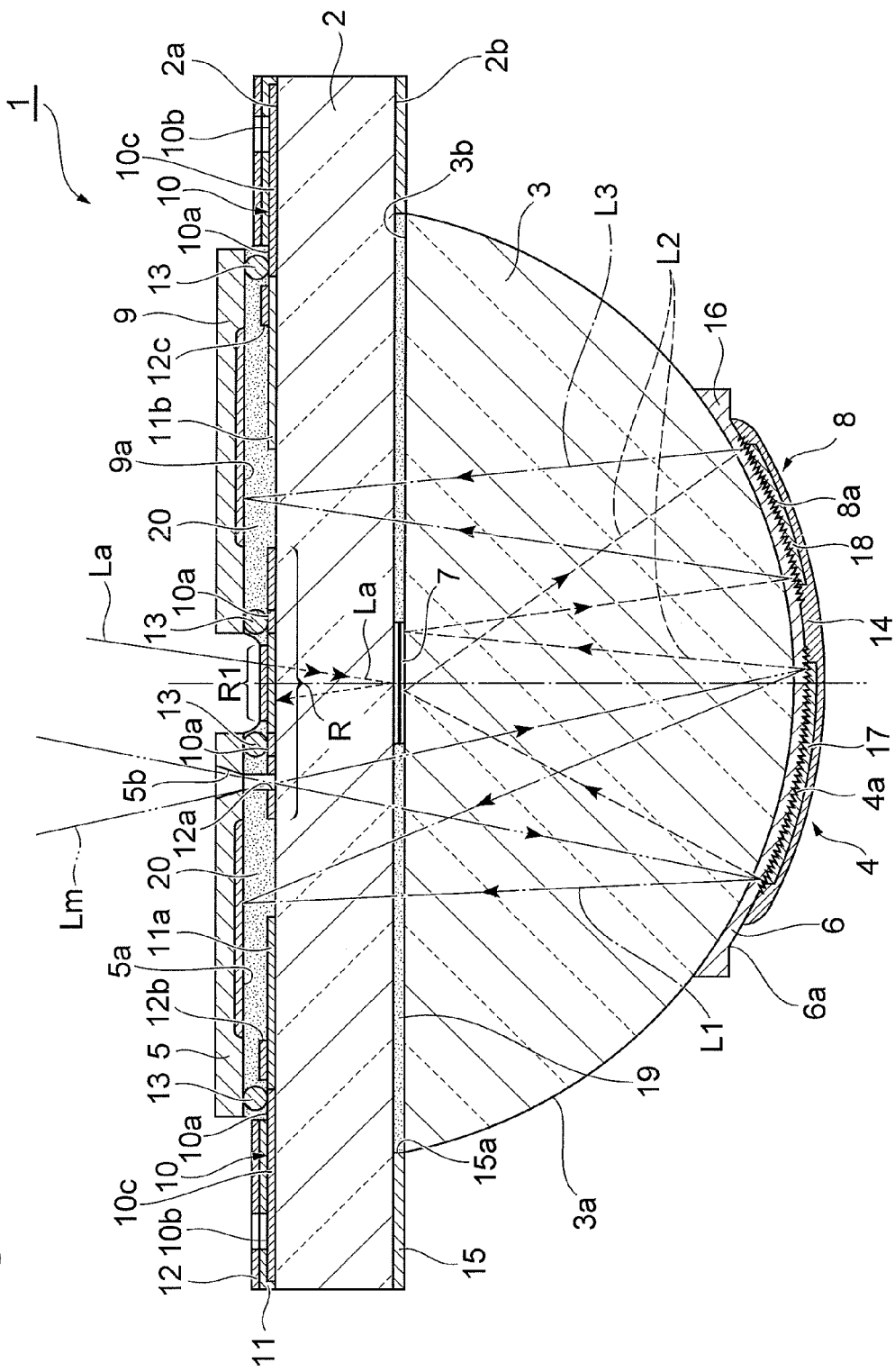
FIG. 2 is a sectional view taken along the line II-II of FIG. 1.

As illustrated in FIGS. 1 and 2, a spectroscopic module 1 comprises a substrate (main unit, second part) 2 and a lens unit (main unit, first part) 3 which transmit therethrough light Lm incident thereon from the front side (one side), a spectroscopic unit (first spectroscopic unit) 4 which disperses the light Lm incident on the substrate 2 and lens unit 3 and reflects it to the front side, and a photodetector (first photodetector) 5 which detects a light component (first light having a first order diffraction light) L1 which is the −1st-order light dispersed by the spectroscopic unit 4. The spectroscopic module 1 also comprises a reflection unit 7 which reflects a light component (second light having a second order diffraction light) L2 which is the zero-order light dispersed by the spectroscopic unit 4 to the rear side (the other side), a spectroscopic unit 8 which disperses the light L2 reflected by the reflection unit 7 and reflects it to the front side, and a photodetector (second photodetector) 9 which detects a light component (third light) L3 dispersed by the spectroscopic unit 8.

The substrate 2 is formed into an oblong sheet from light-transmitting glass such as BK7, Pyrex (registered trademark), or silica, light-transmitting molded glass, light-transmitting plastics, or the like. A wiring pattern 10 constituted by a single-layer film of Al, Au, or the like or a multilayer film of Cr—Pt—Au, Ti—Pt—Au, Ti—Ni—Au, Cr—Au, or the like is formed on the front face 2a of the substrate 2. The wiring pattern 10 includes a plurality of pad units 10a, a plurality of pad units 10b, and a plurality of connection units 10c for connecting the corresponding pad units 10a, 10b to each other. An antireflection layer constituted by a single-layer film of Cr0 and the like or a multilayer film of Cr—CrO and the like is formed closer to the front face 2a of the substrate 2 than is the wiring pattern 10.

The front face 2a of the substrate 2 is formed with a light-absorbing layer 12. The light-absorbing layer 12 covers the connection units 10c of the wiring pattern 10, while exposing the pad units 10a, 10b of the wiring pattern 10. The light-absorbing layer 12 is provided with openings 12a, 12b, 12c. The opening 12b is located on one side in the longitudinal direction of the substrate 2, while the opening 12c is located on the other side in the longitudinal direction of the substrate 2. The opening 12a is located between the openings 12b, 12c. The opening 12a is a hole through which the light Lm incident on the substrate 2 and lens unit 3 passes. The opening 12b is a hole through which the light L1 dispersed by the spectroscopic unit 4 passes, while the opening 12c is a hole through which the light L3 dispersed by the spectroscopic unit 8 passes. Examples of materials for the light-absorbing layer 12 include black resists, colored resins (such as silicone, epoxy, acrylic, urethane, polyimide, and composite resins) containing fillers (such as carbon and oxides) therein, metals such as Cr and Co or oxides thereof, their multilayer films, and porous ceramics and metals or metal oxides.

An insulating layer 11 is formed between the front face 2a of the substrate 2 and the light-absorbing layer 12. The insulating layer 11 covers the connection units 10c of the wiring pattern 10, while exposing the pad units 10a, 10b of the wiring pattern 10. An insulating part 11a which is a part of the insulating layer 11 covers a part on one side in the longitudinal direction of the substrate 2 within the opening 12b. An insulating part 11b which is a part of the insulating layer 11 covers a part on the other side in the longitudinal direction of the substrate 2 within the opening 12c. The insulating parts 11a, 11b function as optical filters for cutting predetermined wavelength regions of light.

Outer terminals of photodetectors 5, 9 shaped into oblong sheets are connected by facedown bonding through bumps 13 to the pad units 10a exposed from the insulating layer 11 and light-absorbing layer 12. The photodetector 5 is located on one side in the longitudinal direction of the substrate 2 so that a light detecting portion 5a opposes the opening 12b of the light-absorbing layer 12. The photodetector 9 is located on the other side in the longitudinal direction of the substrate 2 so that a light detecting portion 9a opposes the opening 12c of the light-absorbing layer 12.

The light detecting portion 5a of the photodetector 5 is constructed by one-dimensionally arranging elongated photodiodes in a direction substantially perpendicular to their longitudinal direction. The photodetector 5 is arranged such that the one-dimensional arrangement direction of photodiodes substantially coincides with the longitudinal direction of the substrate 2 while the light detecting portion 5a is oriented to the front face 2a of the substrate 2. The photodetector 5 is not restricted to the photodiode array, but may be a C-MOS image sensor, a CCD-image sensor, or the like.

The photodetector 5 is provided with a light-transmitting hole 5b through which the light Lm incident on the substrate 2 and lens unit 3 passes. The light-transmitting hole 5b is juxtaposed with the light-transmitting hole 5a along the one-dimensional arrangement direction of photodiodes so as to oppose the opening 12a of the light-absorbing layer 12. The light-transmitting hole 5b, which is a slit extending in a direction substantially perpendicular to the longitudinal direction of the substrate 2 and substantially parallel to the front face 2a of the substrate 2, is formed by etching or the like while being positioned highly accurately with respect to the light detecting portion 5a.

As with the light detecting portion 5a of the photodetector 5, the light detecting portion 9a of the photodetector 9 is constructed by one-dimensionally arranging elongated photodiodes in a direction substantially perpendicular to their longitudinal direction. The photodetector 9 is arranged such that the one-dimensional arrangement direction of photodiodes substantially coincides with the longitudinal direction of the substrate 2 while the light detecting portion 9a is oriented to the front face 2a of the substrate 2. The photodetector 9 is not restricted to the photodiode array, but may be a C-MOS image sensor, a CCD-image sensor, or the like.

An underfill material 20 which transmits therethrough at least the light L1 fills a space on the substrate 2 side of the photodetector 5 (between the photodetector 5 and the substrate 2, insulating layer 11, or light-absorbing layer 12 here). Similarly, an underfill material 20 which transmits therethrough at least the light L3 fills a space on the substrate 2 side of the photodetector 9 (between the photodetector 9 and the substrate 2, insulating layer 11, or light-absorbing layer 12 here). The underfill material 20 fills the whole space between the photodetector 5, 9 and the substrate 2 in the structure illustrated in FIG. 2, but may fill the surroundings of the bumps 13 alone. The pad units 10b exposed from the insulating layer 11 and light-absorbing layer 12 function as outer terminals of the spectroscopic module 1. That is, outer wiring and the like are connected electrically and physically to the pad units 10b exposed from the light-absorbing layer 12.

Figure 3:
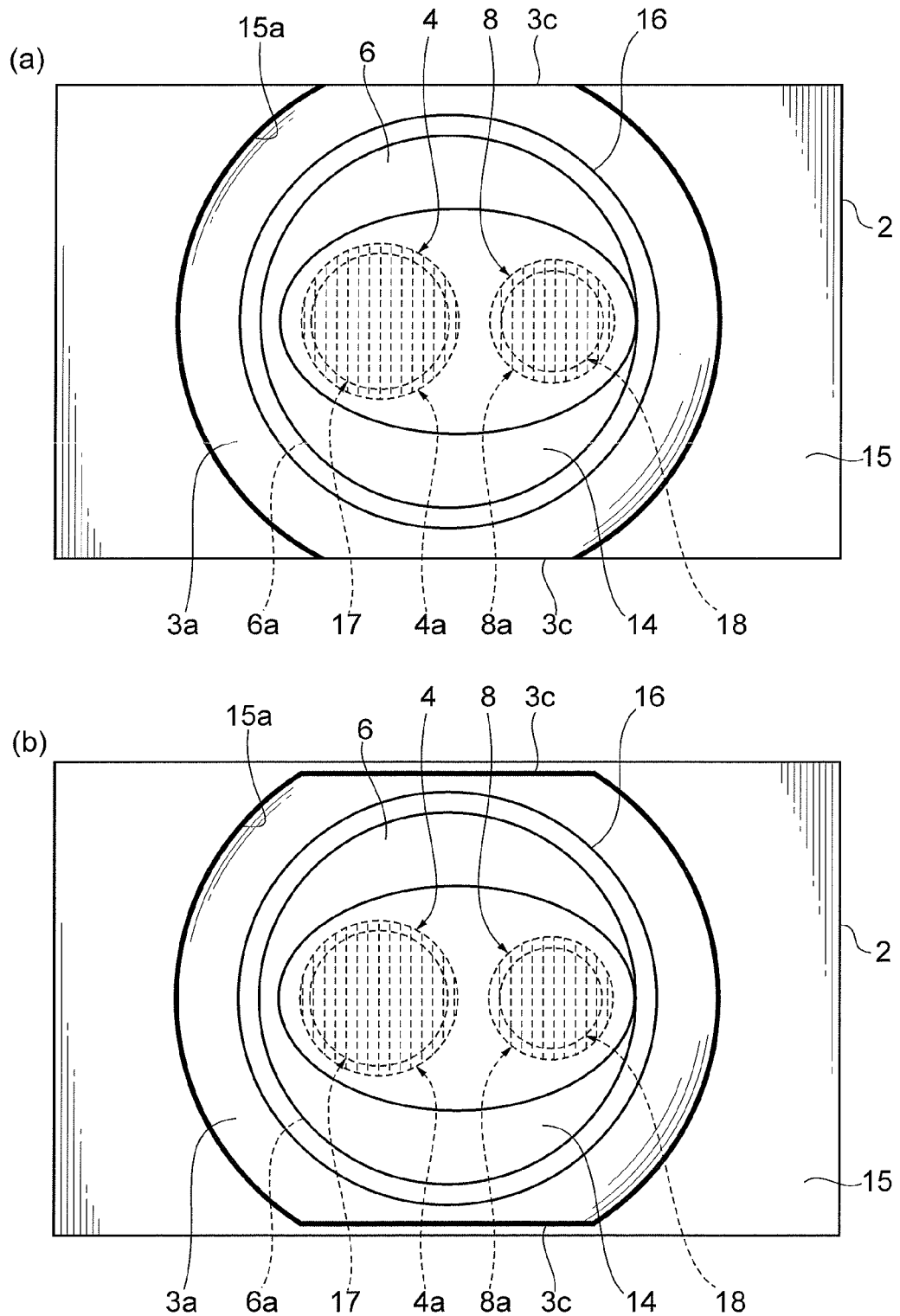
FIG. 3 is a bottom plan view of the spectroscopic module of FIG. 1.

As illustrated in FIGS. 2 and 3, the lens unit 3 having a spherical outer surface 3a is disposed on the rear face 2b of the substrate 2, while interposing the reflection unit 7 therebetween. The lens unit 3 has such a shape that a semispherical lens made of the same material as with the substrate 2, a light-transmitting resin, a light-transmitting inorganic/organic hybrid material, a light-transmitting low-melting glass or plastic material for molding a replica, or the like is cut off by two planes substantially parallel to each other and substantially orthogonal to its bottom face 3b so as to form side faces 3c. The lens unit 3 is fitted into an opening 15a of a resist layer 15 formed in the rear face 2b of the substrate 2 and bonded to the rear face 2b of the substrate 2 with an optical resin material 19 which transmits therethrough at least the lights Lm, L1, L3. The lens form may be either spherical or aspherical.

The side faces 3c of the lens unit 3 may coincide with sides (outer edges) of the substrate 2 as illustrated in FIG. 3(a) or fall inside thereof as illustrated in FIG. 3(b). When locating the side faces 3c of the lens unit 3 on the inside of the sides (outer edges) of the substrate 2, shaping the opening 15a of the resist layer 15 into a form corresponding to the bottom face (front face) of the lens unit 3 can prevent the lens unit 3 from moving rotationally and shifting its mounting position at the time of mounting thereof.

The spectroscopic units 4, 8 are provided on the rear side of the lens unit 3. The spectroscopic unit 4 is located on one side in the longitudinal direction of the substrate 2 so as to oppose the photodetector 5. The spectroscopic unit 8 is located on the other side in the longitudinal direction of the substrate 2 so as to oppose the photodetector 9. The spectroscopic unit 4 has a diffraction grating pattern 4a formed on a diffraction layer 6 and a reflection layer 17 formed so as to cover the diffraction grating pattern 4a. Similarly, the spectroscopic unit 8 has a diffraction grating pattern 8a formed on the diffraction layer 6 and a reflection layer 18 formed so as to cover the diffraction grating pattern 8a.

The diffraction layer 6, which is shaped into a film conforming to the outer surface 3a of the lens unit 3, is integrally formed with a flange 16 which is thicker than the diffraction layer 6 while extending along a periphery 6a thereof. The diffraction grating layer 6 and flange 16 are provided by photocuring any of optical resins for a replica such as photocurable epoxy resins, acrylic resins, fluorine-based resins, PMMA, silicone, and organic/inorganic hybrid resins. The diffraction grating patterns 4a, 8a, examples of which include blazed gratings with sawtooth cross sections, binary gratings with rectangular cross sections, or holographic gratings with sinusoidal cross sections, are constructed by juxtaposing a plurality of grooves along the longitudinal direction of the substrate 2. The reflection layers 17, 18, which are shaped into films, are formed by vapor-depositing Al or Au, for example.

The diffraction layer 6 is formed like a circle when seen from the rear side, while the flange 16 is formed like a circular ring when seen from the rear side. The reflection layers 17, 18 are formed like circles when seen from the rear side and included in the respective regions formed with their corresponding diffraction grating patterns 4a, 8a. On the outer (rear) surface of the diffraction layer 6, a protective layer 14 such as a passivation film is formed so as to include and cover the reflection layers 17, 18 when seen from the rear side. The protective layer 14, which is shaped into a film, is formed by a vapor-deposited film of $MgF_2$, $SiO_2$, or the like or an organic film which is proof against water and humidity, for example.

The reflection unit 7 is located on the rear side of (i.e., on the side closer to the spectroscopic units 4, 8 than are) the light detecting portion 5a of the photodetector 5, the light detecting portion 9a of the photodetector 9, and the light-absorbing layer 12. The reflection unit 7 opposes a region R between the light detecting portions 5a, 9a in the light-absorbing layer 12 and includes a region R1 between the photodetectors 5, 9 in the light-absorbing layer 12 (i.e., a part of the light-absorbing layer 12 exposed to the front side through a gap between the photodetectors 5, 9) when seen from the front side.

In thus constructed spectroscopic module 1, the light Lm incident on the substrate 2 and lens unit 3 is dispersed and reflected to the front side by the spectroscopic unit 4. In the light Lm dispersed by the spectroscopic unit 4, the light L1 advances to the front side and is detected by the photodetector 5. In the light Lm dispersed by the spectroscopic unit 4, the light L2 advances to the front side and is reflected to the rear side by the reflection unit 7. The light L2 reflected by the reflection unit 7 is dispersed and reflected to the front side by the spectroscopic unit 8. In the light Lm dispersed by the spectroscopic unit 8, the light L3 advances to the front side and is detected by the photodetector 9. Since the spectroscopic unit 8 and the photodetector 9 are thus provided in addition to the spectroscopic unit 4 and the photodetector 5, the detection sensitivity can be enhanced for light in a wide wavelength range or different wavelength regions of light, so as to widen the detectable wavelength range.

The light-transmitting hole 5b and the light-absorbing layer 12 are disposed between the light detecting portions 5a, 9a of the photodetectors 5, 9, while the reflection unit 7 is provided so as to oppose the light-absorbing layer 12 (i.e., the region R). Thus using the region between the light detecting portions 5a, 9a can prevent the spectroscopic module 1 from becoming larger.

Ambient light La, which is likely to reach the light-transmitting hole 5b and thereabout when the light Lm is made incident on the substrate 2 and lens unit 3 from the light-transmitting hole 5b, is absorbed in the region R in the light-absorbing layer 12 between the light detecting portions 5a, 9a. Any part of the ambient light La transmitted through the region R in the light-absorbing layer 12 is reliably reflected to the region R in the light-absorbing layer 12 by the reflection unit 7 disposed so as to oppose the region R in the light-absorbing layer 12 and include the region R1 thereof. This can inhibit stray light from being caused by the incidence of the ambient light La.

Any part of the ambient light La (a long wavelength light component in particular) entering the lens unit 3 through the region R becomes a part of stray light and increases the stray light unnecessary for spectrometer characteristics in the lens unit 3. The light L2 mostly has a light intensity not so higher than that of the light L1, whereby the light L3, which is a diffracted light of the light L2, further lowers its light intensity. That is, the lights L2, L3 are highly susceptible to the stray light caused by the ambient light La. Providing the reflection unit 7 as mentioned above is extremely effective in mitigating such a state.

Because of the foregoing, the present invention makes it possible to accurately detect light in a wide wavelength range or different wavelength regions of light, while preventing the size from becoming larger.

The region R1 disposed between the photodetectors 5, 9 in the light-absorbing layer 12 is included in the reflection unit 7 when seen from the front side of the substrate 2. As a consequence, a part of the ambient light La transmitted through the region R1 can be reflected more reliably to the region R.

Since the spectroscopic units 4, 8 are disposed on the outer surface 3a of the lens unit 3, the diffraction layer 6 can be formed very thin, e.g., into a thickness of 1 to 20 μm. This can suppress light absorption in the diffraction layer 6 and improve light utilization efficiency. Forming the diffraction layer 6 very thin can also inhibit the diffraction layer 6 from being deformed (e.g., expanded and contracted) by heat and moisture, whereby stable spectroscopic characteristics and high reliability can be secured. On the other hand, providing the spectroscopic units 4, 8 on the outer surface 3a can make the flange 16 thicker than the diffraction layer 6 reliably and easily and prevent the diffraction layer 5 from peeling off from the outer surface 3a.

A method of manufacturing the above-mentioned spectroscopic module 1 will now be explained.

Figure 4:
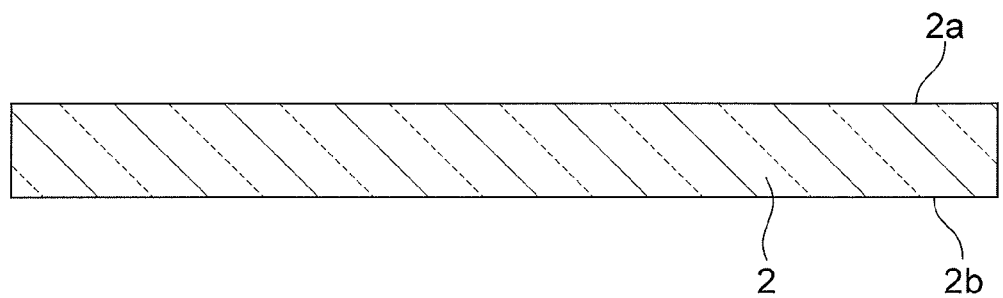
FIG. 4 is a sectional view for explaining a method of manufacturing the spectroscopic module of FIG. 1.
Figure 4:
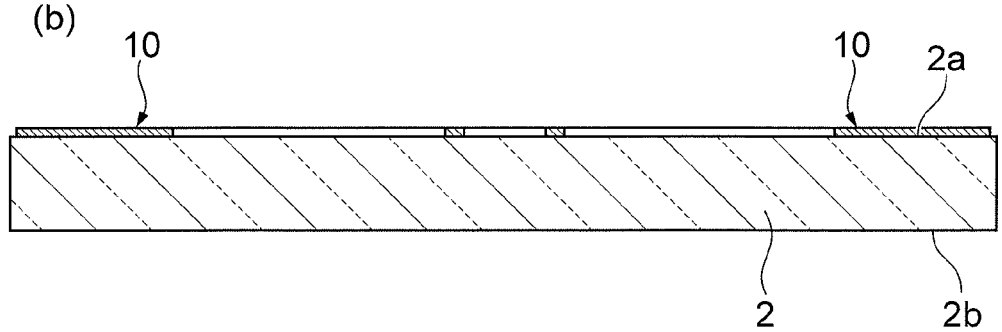
Figure 4:
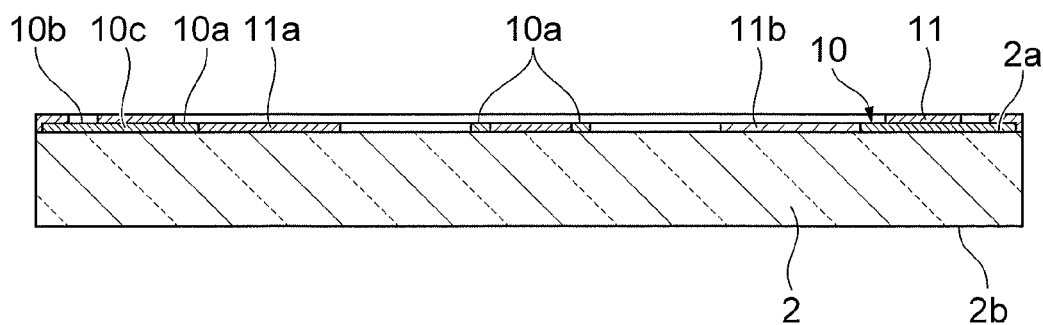

First, as illustrated in FIG. 4(a), the substrate 2 is prepared. Thereafter, as illustrated in FIG. 4(b), the wiring pattern 10 is formed on the front face 2a of the substrate 2. Further, as illustrated in FIG. 4(c), an insulating layer 11 is formed so as to expose the parts to become the pad units 10a, 10b in the wiring pattern 10 to the front side and cover the parts to become the connection units 10c in the wiring pattern 10. When forming the insulating layer 11, the insulating parts 11a, 11b are simultaneously formed as a part of the insulating layer 11. The insulating parts 11a, 11b may be formed from materials different from each other, so as to function as two kinds of optical filters.

Figure 5:
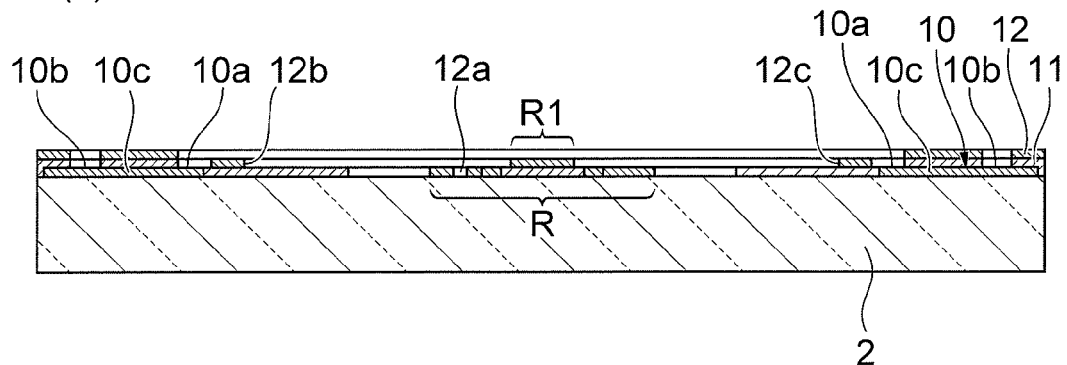
FIG. 5 is a sectional view for explaining the method of manufacturing the spectroscopic module of FIG. 1.
Figure 5:
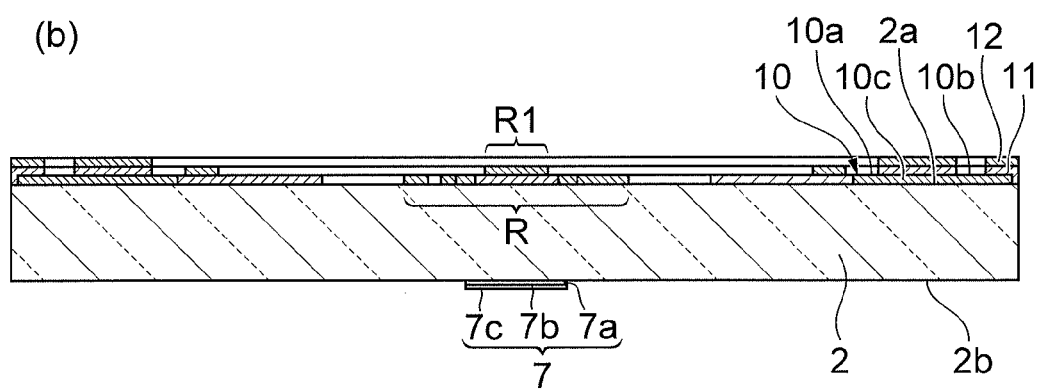
Figure 5:
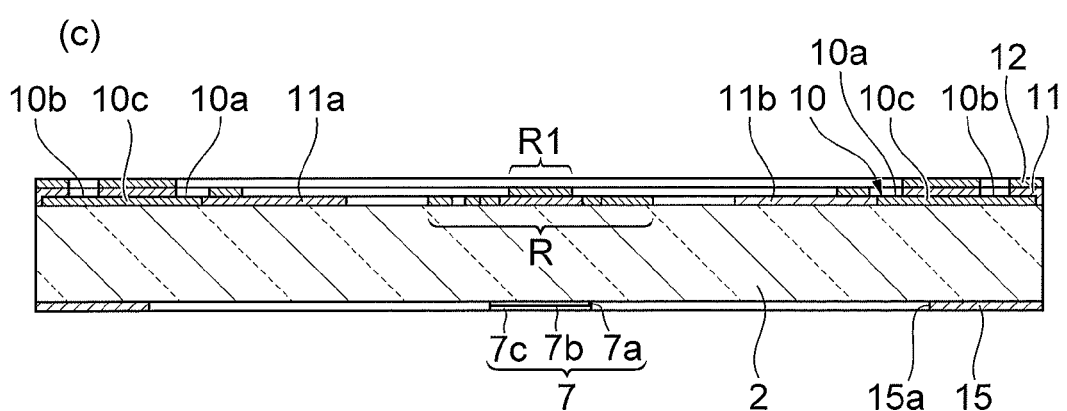

Next, as illustrated in FIG. 5(a), the light-absorbing layer 12 is formed so as to expose the parts to become the pad units 10a, 10b to the front side and cover the parts to become the connection units 10c. Thereafter, as illustrated in FIG. 5(b), the reflection unit 7 is formed on the rear face 2b of the substrate 2 as a multilayer structure comprising a foundation layer 7a, an intermediate layer 7b, and a reflection layer 7c in sequence from the rear face 2b side. An example of the multilayer structure comprises a Ti or Cr layer as the foundation layer 7a, a Pt layer as the intermediate layer 7b, and an Au layer as the reflection layer 7c. Further, as illustrated in FIG. 5(c), the resist layer 15 having the opening 15a is formed on the rear face 2b of the substrate 2.

The reflection layer 7c is not limited to the Au layer, but may be a layer made of a high-reflectance metal film or metal oxide film based on Al or the like. The reflection unit 7 may also be formed by a dielectric multilayer mirror. As these materials, those having a high reflectance are selected according to wavelengths to be dealt with by the spectroscopic module.

Figure 6:
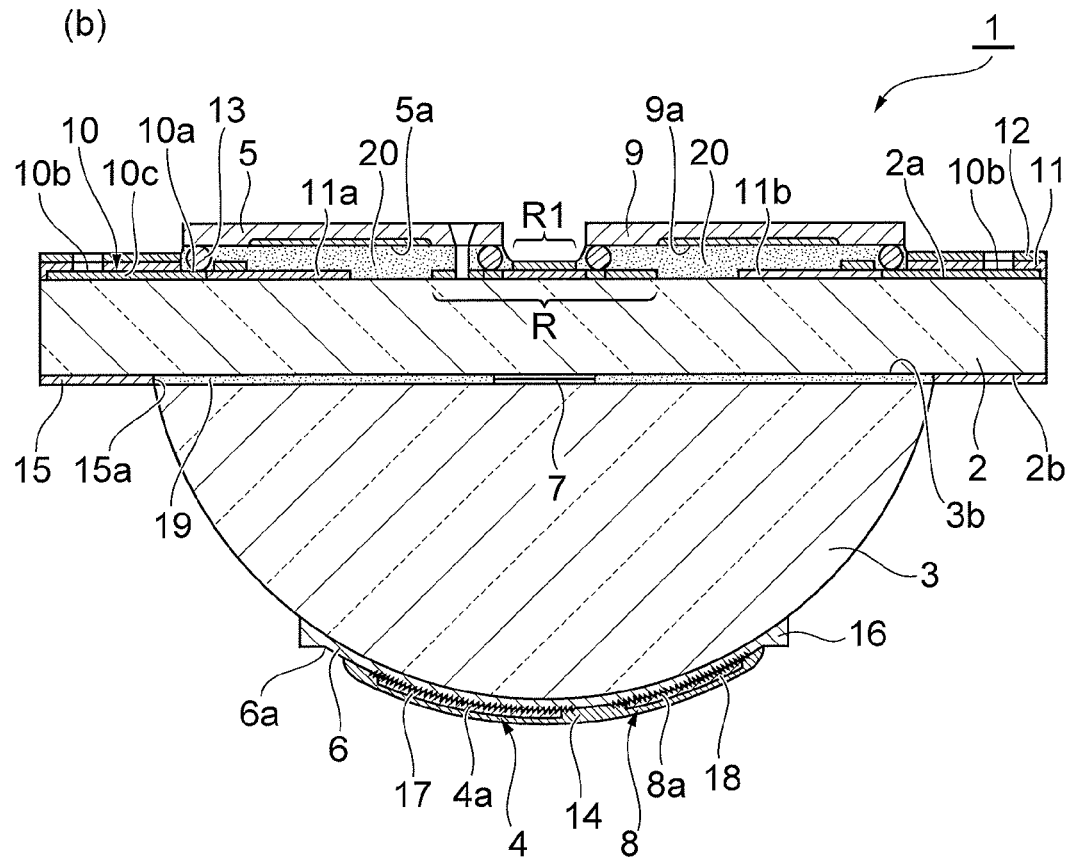
FIG. 6 is a sectional view for explaining the method of manufacturing the spectroscopic module of FIG. 1.

Next, as illustrated in FIG. 6(a), the photodetector 5 is mounted on its corresponding pad units 10a of the wiring pattern 10 by facedown bonding through the bumps 13 such that the light detecting portion 5a and light-transmitting hole 5b face into the openings 12b, 12a, respectively. Similarly, the photodetector 9 is mounted on its corresponding pad units 10a of the wiring pattern 10 by facedown bonding through the bumps 13 such that the light detecting portion 9a faces into the opening 12c. Subsequently, the underfill material 20 is disposed on the substrate 2 side of the photodetectors 5, 9.

On the other hand, the lens unit 3 is formed with the spectroscopic units 4, 8. Specifically, a light-transmitting master grating inscribed with respective gratings corresponding to the diffraction grating patterns 4a, 8a is pressed against an optical resin for a replica dripped near the vertex of the outer surface 3a of the lens unit 3. The optical resin for a replica is hardened by irradiation with light in this state, and then preferably cured by heating for stabilization, so as to form the diffraction layer 6 and the flange 16. A thermosetting resin may also be used as a resin material, so as to form the diffraction layer 6 and the like by heat and pressure application alone. Thereafter, the master grating is released, and Al, Au, or the like is vapor-deposited through a mask onto or directly all over the outer surface of the diffraction layer 6, so as to form the reflection layers 17, 18. Further, $MgF_2$, $SiO_2$, or the like is vapor-deposited through a mask onto or directly all over the outer surfaces of the diffraction grating patterns 4a, 8a and reflection layers 17, 18, or a resin is applied thereto, so as to form the protective layer 14.

Subsequently, as illustrated in FIG. 6(b), the optical resin material 19 is applied to the inside of the opening 15a of the resist layer 15 formed on the rear face 2b of the substrate 2, and the lens unit 3 formed with the spectroscopic units 4, 8 is joined to the rear face 2b of the substrate 2 such as to fit into the opening 15a. Then, the optical resin material 19 is hardened by irradiation with light, so as to yield the spectroscopic module 1.

The opening 15a of the resist layer 15 is formed by photoetching such as to have a predetermined positional relationship with respect to a pattern (not depicted) on the substrate 2 serving as a reference part for positioning the photodetectors 5, 9 with respect to the substrate 2. Here, since the spectroscopic units 4, 8 are positioned highly accurately with respect to the lens unit 3, simply fitting the lens unit 3 into the opening 15a can position the spectroscopic units 4, 8 with respect to the substrate 2. On the other hand, the photodetectors 5, 9 are positioned with respect to the substrate 2 by the pattern (not depicted) on the substrate 1 serving as the reference part. Hence, simply fitting the lens unit 3 into the opening 15a can align not only the spectroscopic unit 4 with the photodetector 5, but also the spectroscopic unit 8 with the photodetector 9.

As explained in the foregoing, the reflection unit 7 is disposed between the substrate 2 and the lens unit 3. This structure makes it possible to form the reflection unit 7 easily and accurately at a position, closer to the spectroscopic units 4, 8 than is the region R in the light-absorbing layer 12, opposing the region R1 in the light-absorbing layer 12. The reflection unit 7 is provided by forming the foundation layer 7a on the rear face 2b of the substrate 2 and forming the reflection layer 7c on the foundation layer 7a, while the substrate 2 and the lens unit 3 are joined to each other so as to hold the reflection unit 7 therebetween. This allows the reflection layer 7c to face the spectroscopic units 4, 8, whereby the light L2 can be reflected reliably.

The present invention is not limited to the above-mentioned embodiment.

For example, the reflection unit 7 may be provided by embedding a metal piece or the like in the substrate 2 or lens unit 3. Without providing the photodetector 5 with the light-transmitting hole 5b, the region R1 in the light-absorbing layer 12 may be provided with a light-transmitting hole as a light entrance portion for letting the light Lm into the substrate 2 and lens unit 3. In terms of the diffraction order to be dealt with by the spectroscopic module, the lights L1, L2 are not limited to the −1st-order and zero-order lights, respectively, as long as their orders differ from each other.

INDUSTRIAL APPLICABILITY

The present invention can provide a spectroscopic module which can accurately detect light in a wide wavelength range or different wavelength regions of light while being prevented from becoming larger in size.

REFERENCE SIGNS LIST

1 ... spectroscopic module; 2 ... substrate (second part); 3 ... lens unit (first part); 4 ... spectroscopic unit (first spectroscopic unit); 5 ... detection device (first photodetector); 5a ... detection unit (first light detecting portion); 5b ... light-transmitting hole (light entrance portion); 7 ... reflection unit; 8 ... spectroscopic unit (second spectroscopic unit); 9 ... detection device (second photodetector); 9a ... detection unit (second light detecting portion); 12 ... light-absorbing layer; R ... region (region between the first and second light detecting portions in the light-absorbing layer); R1 ... region (region between the first and second light detecting portions in the light-absorbing layer); Lm ... light; L1 ... light (first light); L2 ... light (second light); L3 ... light (third light)

The invention claimed is:

1. A spectroscopic module comprising:
    a main unit for transmitting therethrough light incident thereon from one side;
    a first spectroscopic unit, disposed on the other side of the main unit, for dispersing the light incident on the main unit and reflecting the light to the one side of the main unit;
    a first photodetector, arranged on the one side of the main unit, for detecting a first light having a first order diffraction light and dispersed by the first spectroscopic unit;
    a reflection unit for reflecting a second light having a second order diffraction light and dispersed by the first spectroscopic unit;
    a second spectroscopic unit, disposed on the other side of the main unit, for dispersing the second light reflected by the reflection unit and reflecting the second light to the one side of the main unit; and
    a second photodetector, arranged on the one side of the main unit, for detecting a third light dispersed by the second spectroscopic unit;
    wherein, on the one side of the main unit, a light entrance portion for letting the light into the main unit and a light-absorbing layer for absorbing the light are disposed between a first light detecting portion of the first photodetector and a second light detecting portion of the second photodetector; and
    wherein the reflection unit is located closer to the first and second spectroscopic units than are the first and second photodetectors and the light-absorbing layer and opposes the light-absorbing layer.

2. A spectroscopic module according to claim 1, wherein a region between the first and second photodetectors in the light-absorbing layer is included in the reflection unit when seen from the one side of the main unit.

3. A spectroscopic module according to claim 1, wherein the main unit has a first part and a second part located closer to the first and second photodetectors than is the first part and joined to the first part; and
    wherein the reflection unit is disposed between the first and second parts.

* * * * *